US012057656B2

(12) United States Patent
Lee et al.

(10) Patent No.: US 12,057,656 B2
(45) Date of Patent: Aug. 6, 2024

(54) RECEPTACLE CONNECTOR

(71) Applicant: LS MTRON LTD., Anyang-si (KR)

(72) Inventors: Hyun Woo Lee, Anyang-si (KR); Jung Hoon Choi, Anyang-si (KR); Sun Hak Lee, Anyang-si (JP)

(73) Assignee: LS MTRON LTD., Anyang-si (KR)

( * ) Notice: Subject to any disclaimer, the term of this patent is extended or adjusted under 35 U.S.C. 154(b) by 398 days.

(21) Appl. No.: 17/631,313

(22) PCT Filed: Apr. 9, 2021

(86) PCT No.: PCT/KR2021/004483
§ 371 (c)(1),
(2) Date: Jan. 28, 2022

(87) PCT Pub. No.: WO2021/215718
PCT Pub. Date: Oct. 28, 2021

(65) Prior Publication Data

US 2022/0263268 A1 Aug. 18, 2022

(30) Foreign Application Priority Data

Apr. 20, 2020 (KR) ........................ 10-2020-0047450
Apr. 1, 2021 (KR) ........................ 10-2021-0042617

(51) Int. Cl.
*H01R 13/52* (2006.01)
*H01R 13/502* (2006.01)

(52) U.S. Cl.
CPC ....... *H01R 13/5219* (2013.01); *H01R 13/502* (2013.01); *H01R 13/5202* (2013.01)

(58) Field of Classification Search
CPC .............. H01R 13/5219; H01R 13/502; H01R 13/5202

(Continued)

(56) References Cited

U.S. PATENT DOCUMENTS 4,968,044 A * 11/1990 Petrak .................. F16J 15/3456 384/140
6,126,485 A * 10/2000 Shobara ............... H01R 13/748 439/607.03

(Continued)

FOREIGN PATENT DOCUMENTS

CN 206004057 U 3/2017
CN 207269075 U 4/2018

(Continued)

OTHER PUBLICATIONS

International Search Report for related International Application No. PCT/KR2021/004483; action dated Oct. 28, 2021; (5 pages).

(Continued)

*Primary Examiner* — Abdullah A Riyami
*Assistant Examiner* — Vladimir Imas
(74) *Attorney, Agent, or Firm* — K&L Gates LLP

(57) ABSTRACT

The present disclosure relates to a receptacle connector, comprising a plurality of contacts for electrically connecting a plug connector and a substrate which is provided in an electronic device; an insulating part; a shell; and a sealing part for sealing between the electronic device and the shell, wherein the shell includes a shell body, and a first support part, wherein the first support part may include a first rear support member; a first outer support member which protrudes forward from the first rear support member; a first connecting member which is coupled to the front of the first outer support member; and a first inner support member (Continued)

which is coupled to each of the first connecting member and the shell body and is disposed spaced apart from the first outer support member.

12 Claims, 10 Drawing Sheets

(58) Field of Classification Search
USPC .......................................................... 439/283
See application file for complete search history.

(56) References Cited

U.S. PATENT DOCUMENTS

| | | | | |
|---|---|---|---|---|
| 8,167,634 | B2 * | 5/2012 | Fujiwara | H01R 13/5202 439/271 |
| 9,379,478 | B2 * | 6/2016 | Fabre | H01R 13/5202 |
| 10,096,932 | B2 | 10/2018 | Chang et al. | |
| 10,177,488 | B2 * | 1/2019 | Zhao | H01R 24/20 |
| 10,312,628 | B2 * | 6/2019 | Zhang | H01R 13/6595 |
| 10,622,757 | B2 * | 4/2020 | Kawashima | H01R 13/62938 |
| 11,101,588 | B2 * | 8/2021 | Takagi | H01R 24/66 |
| 11,165,190 | B2 * | 11/2021 | Hsu | H01R 13/5219 |
| 2009/0124121 | A1 * | 5/2009 | Matsuoka | H01R 13/5202 439/550 |
| 2016/0164220 | A1 * | 6/2016 | Kataoka | H01R 13/6581 439/559 |

FOREIGN PATENT DOCUMENTS

| | | | |
|---|---|---|---|
| KR | 101965216 | B1 | 4/2019 |
| KR | 20190045500 | A | 5/2019 |
| KR | 101988280 | B1 | 6/2019 |
| KR | 102010272 | B1 | 8/2019 |
| TW | 558115 | U | 10/2003 |

OTHER PUBLICATIONS

Written Opinion for related International Application No. PCT/KR2021/004483; action dated Oct. 28, 2021; (4 pages).
Office Action for related Chinese Application No. 202180004316.6; action dated Sep. 18, 2023; (7 pages).

* cited by examiner

RECEPTACLE CONNECTOR

CROSS-REFERENCE TO RELATED APPLICATIONS

The present application is a National Stage of International Application No. PCT/KR2021/004483 filed on Apr. 9, 2021, which claims the benefit of Korean Patent Application No. 10-2020-0047450, filed on Apr. 20, 2020; and Korean Patent Application No. 10-2021-0042617, filed on Apr. 1, 2021 with the Korean Intellectual Property Office, the entire contents of each hereby incorporated by reference.

FIELD

The present disclosure relates to a receptacle connector coupled to an electronic device for connection with a plug connector.

BACKGROUND

Generally, receptacle connectors are coupled to substrates provided in a variety of electronic devices for connection with corresponding plug connectors. For example, a receptacle connector may be installed in electronic devices such as a portable computer, a cellular phone, and the like and used to perform a charging function, a data transmission function, and the like.

As electronic devices have been required recently to be equipped with further reinforced waterproofing performance than daily waterproofing performance, development of receptacle connectors having reinforced waterproofing performance has been vigorously performed.

Meanwhile, although waterproofing performance with respect to each of a receptacle connector and an electronic device is reinforced, overall waterproofing performance is degraded due to a gap generated between the receptacle connector and the electronic device while the receptacle connector is coupled to the electronic device. Hereupon, recently, development of structures for sealing between a receptacle connector and an electronic device has been increasingly required.

FIG. 1 is a schematic side view illustrating a state in which a receptacle connector 100 according to a related art is coupled to an electronic device 200. The receptacle connector 100 includes a support member 110, a shell 120, and a sealing portion 130. The electronic device 200 may move backward (in a BD arrow direction) to be coupled to the receptacle connector 100 and may move forward (in an FD arrow direction) to be separated from the receptacle connector 100.

The sealing portion 130 coupled to the support member 110 seals a gap between the shell 120 and the electronic device 200. In detail, when the electronic device 200 pressurizes the sealing portion 130 backward, the sealing portion 130 is supported by the support member 110 to seal a space between the support member 110 and the electronic device 200 so as to seal the gap between the shell 120 and the electronic device 200. Here, in the receptacle connector 100 according to the related art, since the support member 110 is disposed on a front end of the shell 120, the sealing portion 130 protrudes forward (in the FD arrow direction) from the shell 120. Accordingly, in the receptacle connector 100 according to the related art, since an overall length of the receptacle connector 100 increases by a thickness A of the sealing portion 130, there is a problem that the miniaturization of receptacle connectors is interrupted.

SUMMARY

Therefore, the present disclosure is designed to solve the problems and is for providing a receptacle connector capable of implementing a waterproof structure of a space between the receptacle connector and an electronic device and reducing an increase in an overall length of the receptacle connector.

To solve the above problems, the present disclosure may include the following configurations.

A receptacle connector according to the present disclosure may include a plurality of contacts configured to electrically connect a plug connector to a substrate provided in an electronic device, an insulation portion to which the contacts are coupled, a shell to which the insulation portion is coupled, and a sealing portion configured to seal a space between the electronic device and the shell. The shell may include a shell body configured to accommodate the insulation portion and a first support portion configured to support the sealing portion. The first support portion may include a first rear support member configured to support the sealing portion in the rear of the sealing portion to restrict a distance by which the sealing portion is movable backward, a first external support member protruding forward from the first rear support member and configured to support an inner surface of the sealing portion, a first connecting member coupled in front of the first external support member, and a first internal support member coupled to each of the first connecting member and the shell body and disposed to be spaced apart from the first external support member. The shell body may be formed to have a thickness thicker than at least one of thicknesses of the first external support member and the first internal support member.

According to the present disclosure, the receptacle connector may have the following effects.

The present disclosure may implement a waterproof structure between a receptacle connector using a sealing portion and an electronic device and may contribute to the miniaturization of receptacle connector.

DETAILED DESCRIPTION

Hereinafter, embodiments of a receptacle connector according to the present disclosure will be described in detail with reference to the attached drawings.

Figure 1:
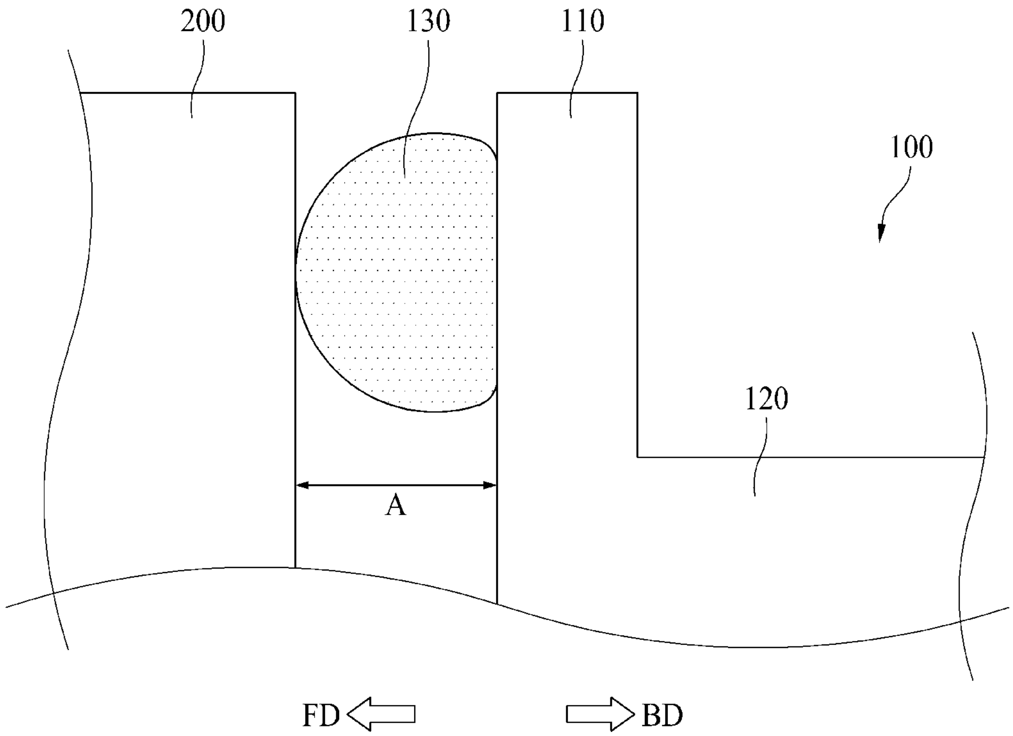
FIG. 1 is a schematic cross-sectional view of a receptacle connector according to a related art.
Figure 2:
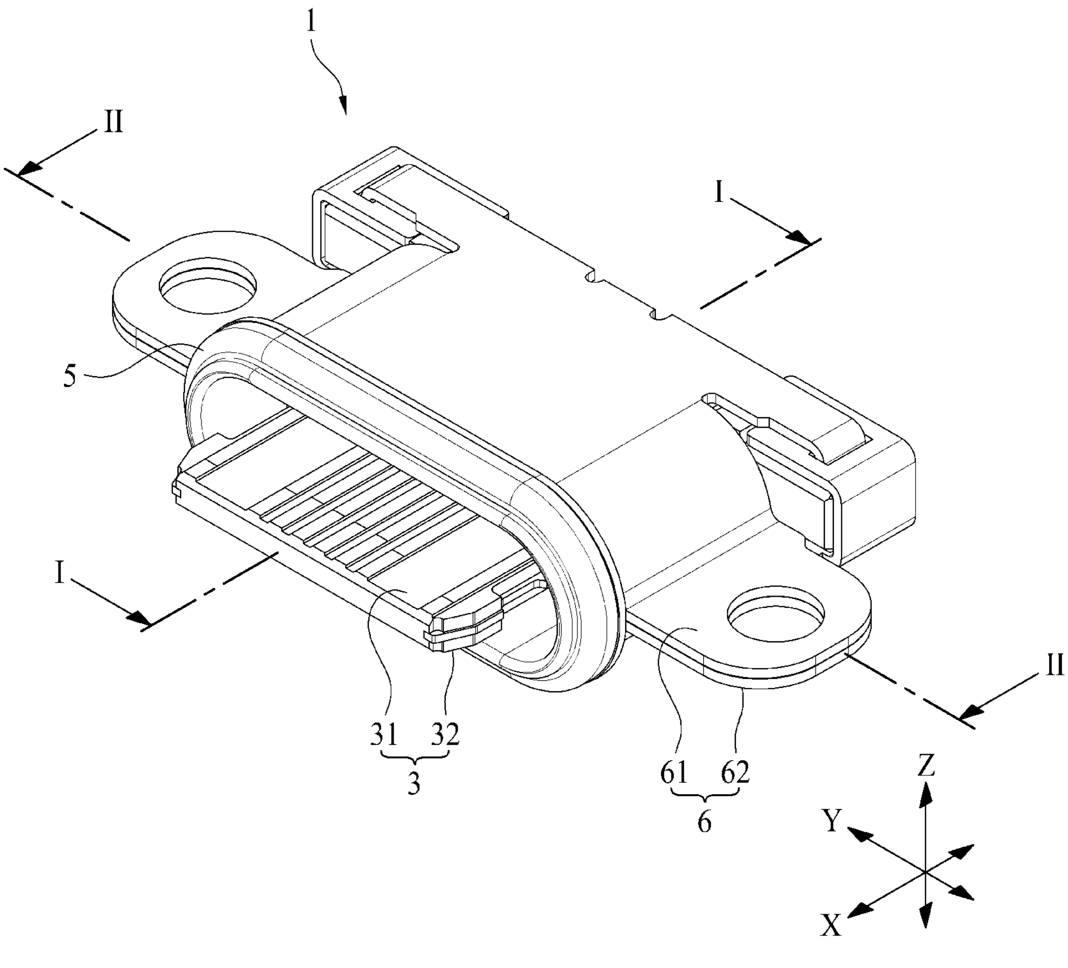
FIG. 2 is a schematic perspective view of a receptacle connector according to the present disclosure.
Figure 3:
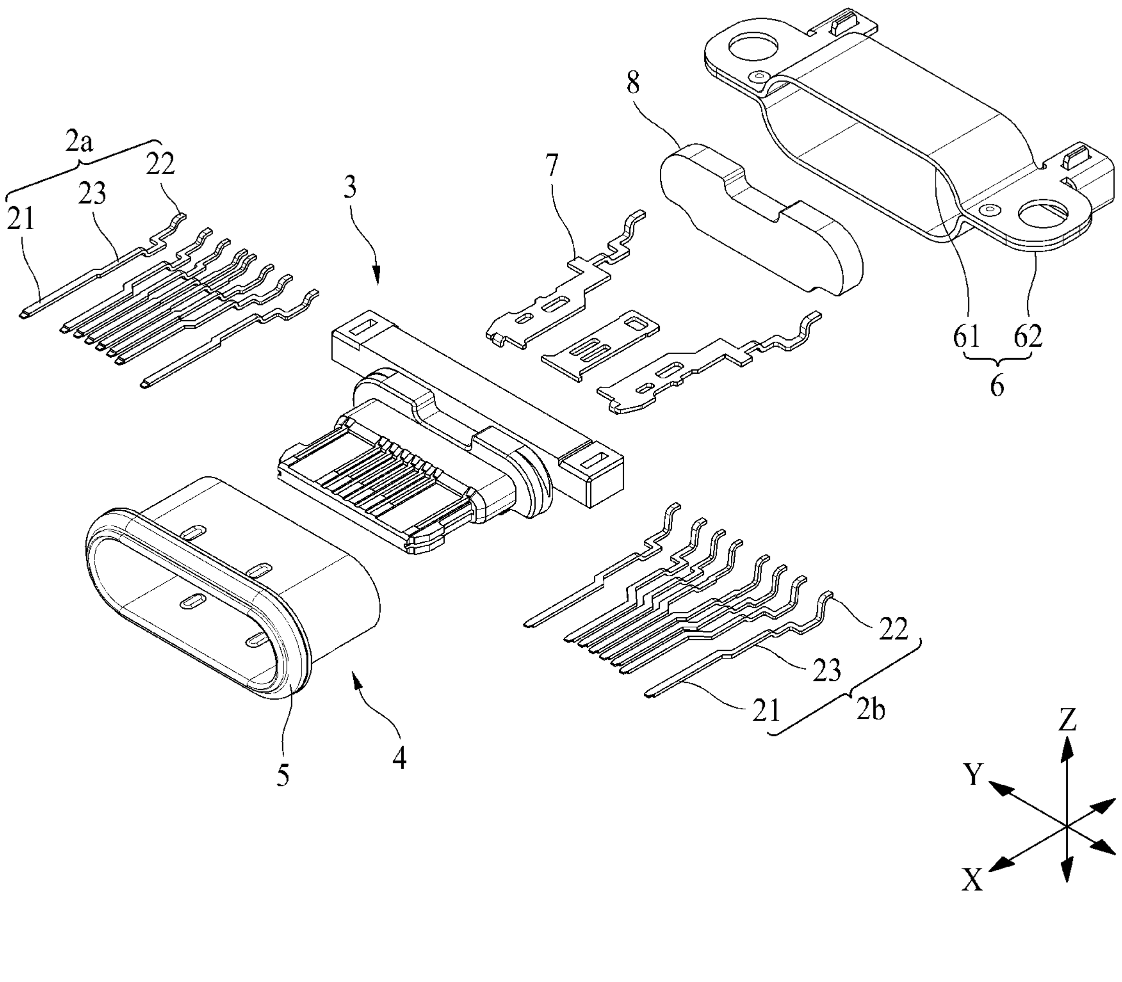
FIG. 3 is a schematic exploded perspective view of the receptacle connector according to the present disclosure.

Referring to FIGS. 2 and 3, a receptacle connector 1 according to the present disclosure is coupled to a substrate provided in a variety of electronic devices for connection with a plug connector. The substrate may be a printed circuit board (PCB).

The receptacle connector 1 according to the present disclosure includes a plurality of contacts 2 configured to electrically connect the plug connector to the substrate, an insulation portion 3 to which the contacts 2 are coupled, a shell 4 to which the insulation portion 3 is coupled, a sealing portion 5 configured to seal a space between the electronic device and the shell 4, and a cover 6 coupled to the shell 4.

The contacts 2 are configured to electrically connect the plug connector to the substrate. The contacts 2 may be connected to the plug connector inserted into the electronic device while being mounted on the substrate so as to electrically connect the plug connector to the substrate. The contacts 2 may be formed of a conductive material. The contacts 2 are coupled with the insulation portion 3. The plurality of contacts 2 may be coupled to the insulation portion 3.

The contacts 2 may each include a connection member 21 (refer to FIG. 3) and a mounting member 22 (refer to FIG. 3).

The connection member 21 is configured to be connected to the plug connector. Some of the contacts 2 may be coupled to the insulation portion 3 so that the connection members 21 are located on one surface of the insulation portion 3. Some of the others of the contacts 2 may be coupled to the insulation portion 3 so that the connection members 21 are located on the other surface of the insulation portion 3. The one surface and the other surface of the insulation portion 3 are surfaces opposite to each other. The one surface of the insulation portion 3 may be a top surface of the insulation portion 3. The other surface of the insulation portion 3 may be a bottom surface of the insulation portion 3.

The mounting member 22 is configured to be mounted on the substrate. Each of the contacts 2 may electrically connect the plug connector to the substrate as the plug connector is connected to the connection member 21 while the mounting member 22 is mounted on the substrate. In this case, the plug connector connected to the connection members 21 may be electrically connected to the substrate through the mounting members 22. Among the contacts 2, the contacts 2 located on the one surface of the insulation portion 3 may be coupled to the one surface of the insulation portion 3 to be spaced apart from each other along a first axial direction (X-axis direction). Among the contacts 2, the contacts 2 located on the other surface of the insulation portion 3 may be coupled to the other surface of the insulation portion 3 to be spaced apart from each other along the first axial direction (X-axis direction).

The contacts 2 may each include a connecting member 23 (refer to FIG. 3).

The connecting member 23 is configured to connect the connection member 21 to the mounting member 22. The connecting member 23 may be coupled to each of the connection member 21 and the mounting member 22 so as to connect the connection member 21 to the mounting member 22. The connecting member 23 may be located between the connection member 21 and the mounting member 22. The connecting member 23, the mounting member 22, and the connection member 21 may be integrally formed.

Figure 5:
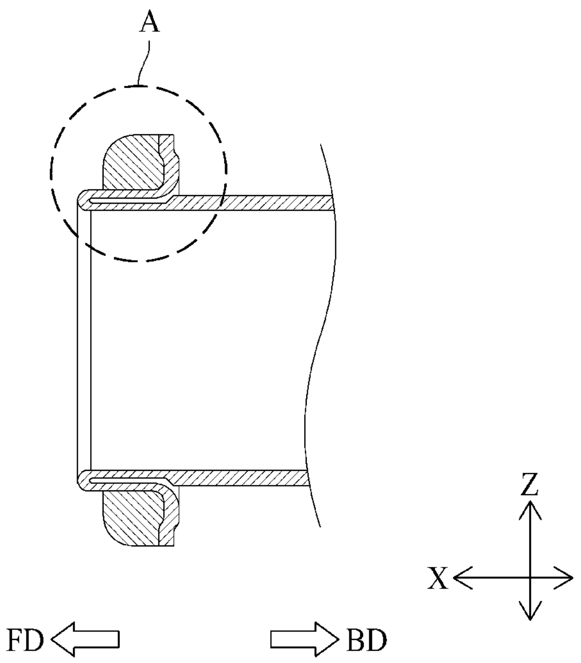
FIG. 5 is a schematic cross-sectional view illustrating a part of the receptacle connector according to the present disclosure taken along line I-I of FIG. 2.

Referring to FIGS. 2 and 3, the insulation portion 3 is configured to support the contacts 2. The insulation portion 3 may include a first insulation member 31 (refer to FIG. 5) and a second insulation member 32 (refer to FIG. 5).

The first insulation member 31 is configured to support the contacts 2. The first insulation member 31 may support the contacts 2 to allow the connection members 21 to be located on a top surface of the first insulation member 31. In this case, the top surface of the first insulation member 31 may be the top surface of the insulation portion 3. The contacts 2 may be coupled to the first insulation member 31 so that the mounting members 22 are located outside the first insulation member 31. The first insulation member 31 and the contacts 2 may be implemented to be coupled to each other through insert molding. The second insulation member 32 is configured to support the contacts 2. The second insulation member 32 may be coupled to the first insulation member 31. The second insulation member 32 may be coupled to the first insulation member 31 to be disposed below the first insulation member 31. The second insulation member 32 may support the contacts 2 to allow the connection members 21 to be located on a bottom surface of the second insulation member 32. In this case, the bottom surface of the second insulation member 32 may be the bottom surface of the insulation portion 3. The contacts 2 may be coupled to the second insulation member 32 so that the mounting members 22 are located outside the second insulation member 32. The second insulation member 32 and the contacts 2 may be implemented to be coupled with each other through insert molding. The insulation portion 3 may be formed of an insulating material.

Figure 4:
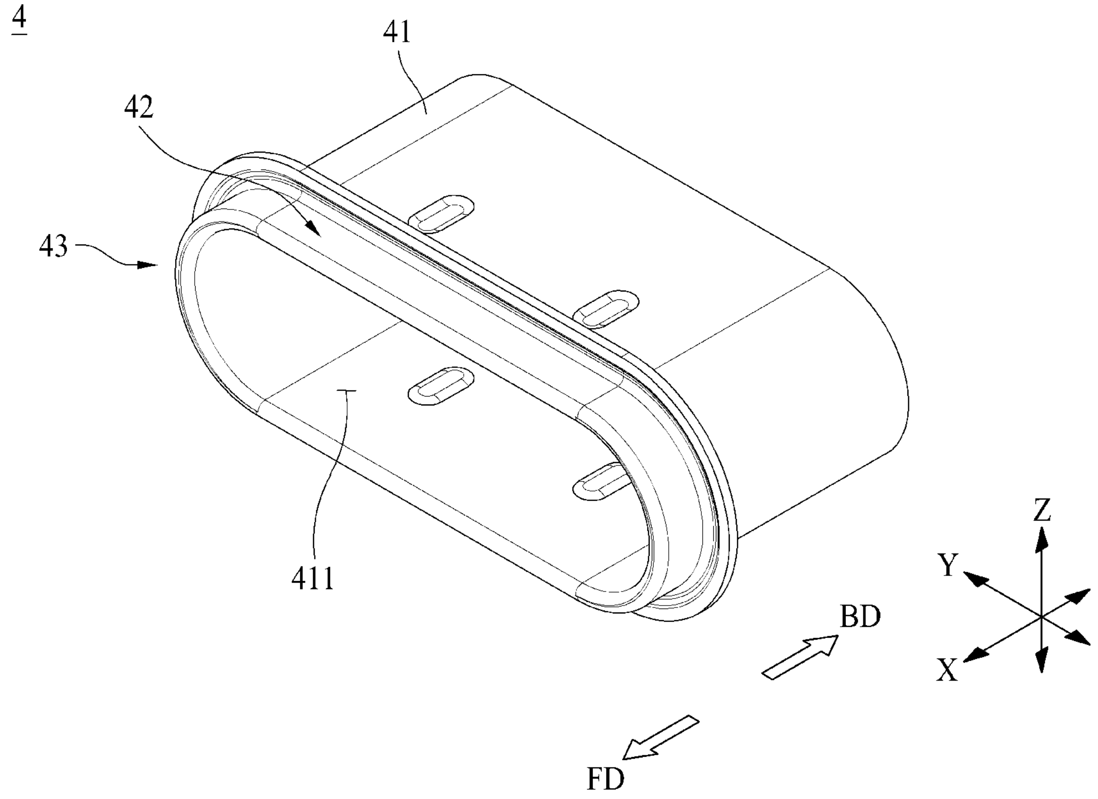
FIG. 4 is a schematic perspective view illustrating a shell of the receptacle connector according to the present disclosure.

Referring to FIGS. 2 to 4, the shell 4 is configured to support the insulation portion 3. The insulation portion 3 may be coupled to the shell 4 to be partially located inside the shell 4. The shell 4 may be processed using a deep drawing method to be integrally formed without a joint.

The shell 4 includes a shell body 41 (refer to FIG. 4), a first support portion 42 (refer to FIG. 4), and a second support portion 43 (refer to FIG. 4).

The shell body 41 is configured to accommodate the insulation portion 3. The insulation portion 3 may be coupled to the shell body 41 to be located inside the shell body 41. The insulation portion 3 may be inserted into the shell body 41 while the contacts 2 are coupled so as to be coupled to the shell body 41. The shell body 41 may protect the contacts 2 and the insulation portion 3 located therein from the outside. The insulation portion 3 may be coupled to the shell body 41 so that the mounting members 22 are located outside the shell body 41. Accordingly, since the plug connector inserted into the electronic device is connected to the connection members 21 while the mounting members 22 located outside the shell body 41 are mounted on the substrate, the contacts 2 may electrically connect the plug connector to the substrate. Since the plug connector moves backward (in the BD arrow direction) and is inserted into the electronic device while being disposed at a position spaced forward (in the FD arrow direction) apart from the shell body 41, the plug connector may be connected to the connection members 21. The insulation portion 3 may be coupled to the shell body 41 so that the mounting members 22 are located in positions spaced backward (in the BD arrow direction) apart from the shell body 41. The shell body 41 may be formed to have an overall hollow elliptical oblong shape but is not limited thereto, and any other shapes capable of protecting the contacts 2 and the insulation portion 3 from the outside are applicable. The shell body 41 may include an accommodation hole 411. The accommodation hole 411 may be formed while passing through the shell body 41. The insulation portion 3 may be coupled to the shell body 41 so that the first insulation member 31 is located in the accommodation hole 411.

The first support portion 42 is configured to support the sealing portion 5. The first support portion 42 may be coupled to the shell body 41 in front (in the FD arrow direction) or in the rear (in the BD arrow direction) thereof. Hereinafter, a description will be set forth on the basis of the first support portion 42 being coupled to the shell body 41 in front thereof. The first support portion 42 may support the sealing portion 5 to restrict a distance by which the sealing portion 5 is movable backward (in the BD arrow direction). Accordingly, when the plug connector moves toward the first support portion 42 and thus pressurizes the sealing portion 5, the sealing portion 5 may be supported by the first support portion 42 to be compressed so as to seal a gap between the plug connector and the first support portion 42. In this case, the sealing portion 5 may be located between the plug connector and the first support portion 42 on the basis of a second axial direction (Y-axis direction) perpendicular to the first axial direction (X-axis direction).

Referring to FIGS. 4 to 7, the first support portion 42 may include a first rear support member 421, a first external support member 422, a first connecting member 423, and a first internal support member 424.

The first rear support member 421 is configured to support the sealing portion 5 in the rear of the sealing portion 5 to restrict a distance by which the sealing portion 5 is movable backward. The first rear support member 421 may be formed to protrude in a direction opposite the accommodation hole 411 of the shell body 41 on the basis of the first external support member 422. The sealing portion 5 may be coupled to the shell 4 to be located in front of the first rear support member 421. Accordingly, the sealing portion 5 may be restricted from moving backward on the basis of the first rear support member 421.

The first external support member 422 is configured to protrude forward from the first rear support member 421 and support an inner surface of the sealing portion 5. For example, the first external support member 422 may be coupled to the first rear support member 421 to extend forward (in the FD arrow direction) from an end of the first rear support member 421 which is close to the accommodation hole 411. A space for accommodating the sealing portion 5 may be formed between the first external support member 422 and the first rear support member 421. The sealing portion 5 accommodated in the space may move along the first external support member 422 until supported by the first rear support member 421. Accordingly, the receptacle connector 1 according to the present disclosure may be implemented to reduce a protruding length of the sealing portion 5 as much as a length of the first external support member 422 while implementing waterproof between the receptacle connector and the electronic device using the sealing portion 5. Accordingly, the receptacle connector 1 according to the present disclosure may implement waterproof between the receptacle connector 1 and the electronic device and contribute to miniaturization of a product.

The first connecting member 423 is coupled to the first external support member 422 to be located in front of the first external support member 422. One end of the first external support member 422 may be connected to the first connecting member 423, and the other end of the first external support member 422 may be connected to the first rear support member 421. The one end of the first external support member 422 may be disposed further forward (in the FD arrow direction) than the other end of the first external support member 422. A surface in front of the first connecting member 423 may be formed to be a curved surface. Accordingly, even when the plug connector is inserted while misaligned, the plug connector may be easily inserted along a front surface of the first connecting member 423 which is formed as a curved surface.

The first internal support member 424 is disposed to be spaced apart from the first external support member 422. The first internal support member 424 may be coupled to each of the first connecting member 423 and the shell body 41. The first connecting member 423 may be coupled to the first internal support member 424 to be located in front of the first internal support member 424. The insulation portion 3 may be inserted into a groove (not shown) formed by an inner surface of the first internal support member 424 and may be inserted into the accommodation hole 411 of the shell body 41. The groove may be connected to the accommodation hole 411. The inner surface of the first internal support member 424 may be formed to surround the insulation portion 3 while the insulation portion 3 is inserted into the accommodation hole 411.

The first rear support member 421, the first external support member 422, the first connecting member 423, the first internal support member 424, and the shell body 41 may be processed through a deep drawing method so as to be integrally formed without a joint.

Here, the shell body 41 may be formed to have a thickness thicker than at least one of thicknesses of the first external support member 422 and the first internal support member 424. For example, a thickness d2 (refer to FIG. 7) of the shell body 41 may be formed to be thicker than a thickness h1 (refer to FIG. 6) of the first external support member 422. For example, the thickness d2 (refer to FIG. 7) of the shell body 41 may be formed to be thicker than a thickness h2 (refer to FIG. 6) of the first internal support member 424. Accordingly, the receptacle connector 1 according to the present disclosure may be implemented to reduce an overall length on the basis of a height direction in comparison to comparative examples in which the shell body 41 has a thickness equal to thicknesses of the first external support member 422 and the first internal support member 424 or thinner than thicknesses of the first external support member 422 and the first internal support member 424. In this case, the height direction may be a third axial direction (Z-axis direction) perpendicular to each of the first axial direction (X-axis direction) and the second axial direction (Y-axis direction). An overall length of the receptacle connector based on the third axial direction is determined by a position of an end of the first rear support member 421 which is located on an outermost side. This is because the embodiment may be implemented to allow the end of the first rear support member 421 which is located on the outermost side to be positioned closer to the accommodation hole 411 in comparison to a comparative example. Accordingly, since the overall length of the receptacle connector based on the third axial direction (Z-axis direction) may be reduced in addition to reduction in an increase in an overall length of the receptacle connector based on the second axial direction (Y-axis direction) by reducing a forwardly protruding degree of the sealing portion 5, the receptacle connector 1 according to the present disclosure may further contribute to miniaturization of the connector. Meanwhile, the shell body 41 may be formed to have a thickness thicker than both the first external support member 422 and the first internal support member 424. In this case, the receptacle connector 1 according to the present disclosure may be implemented to further reduce an overall length of the connector on the basis of a height direction while further reinforcing the strength of the shell body 41 in comparison to both the first external support member 422 and the first internal support member 424.

Figure 6:
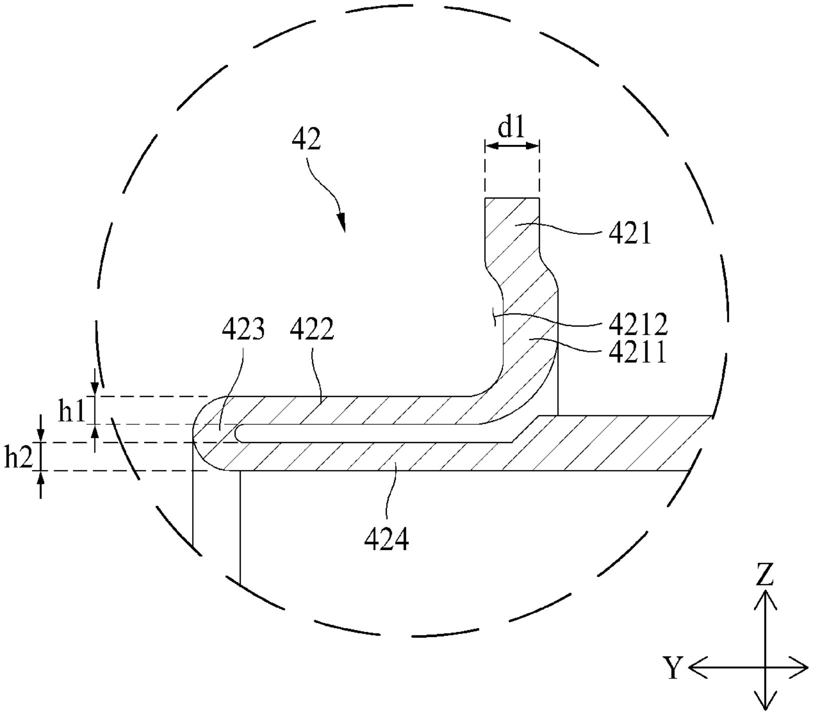
FIGS. 6 and 7 are enlarged schematic cross-sectional views illustrating part A of FIG. 5.

In another embodiment of the present disclosure, the first rear support member 421 may be formed to have a thickness which is thicker than at least one of thicknesses of the first external support member 422 and the first internal support member 424. For example, as shown in FIG. 6, a thickness d1 of the first rear support member 421 may be thicker than at least one of a thickness h1 of the first external support member 422 and a thickness h2 of the first internal support member 424. Accordingly, the embodiment may be implemented to reduce an overall length based on a height direction in comparison to a comparative example in which the first external support member 422 and the first internal support member 424 have thicknesses greater than or equal to that of the first rear support member 421.

In another embodiment of the present disclosure, the first internal support member 424 may be formed to have a thickness which is thicker in comparison to the first external support member 422. That is, it may be satisfied that h2>h1. Accordingly, the receptacle connector 1 according to the present disclosure may reduce the overall length in the third axial direction (Z-axis direction) and reduce a decrease in strength of the first internal support member 424 so as to reduce a degree of damage or deformation of the first internal support member 424 to which an insertion force of the insulation portion 3 is directly applied. Accordingly, the receptacle connector 1 according to the present disclosure may be implemented to reduce a degree of degradation in durability of the shell 4 as the insertion force of the insulation portion 3 is repetitively applied while implementing miniaturization.

In another embodiment of the present disclosure, the first rear support member 421 may be formed to have a thickness which is thicker in comparison to both the first external support member 422 and the first internal support member 424. That is, it may be satisfied that d1>h1 and d1>h2. Accordingly, the receptacle connector 1 according to the present disclosure may further contribute to miniaturization of the receptacle connector by further reducing the overall length in the third axial direction (Z-axis direction).

In another embodiment according to the present disclosure, the first external support member 422 and the first internal support member 424 may be spaced apart from each other so that a distance between an outer surface of the first external support member 422 and an inner surface of the first internal support member 424 is smaller than two times a thickness of the shell body 41. For example, a distance T1 (refer to FIG. 7) between the outer surface of the first external support member 422 and the inner surface of the first internal support member 424 may be smaller than two times the thickness d2 (refer to FIG. 7) of the shell body 41. This may be formed by adjusting a distance g1 (refer to FIG. 7) between an inner surface of the first external support member 422 and an outer surface of the first internal support member 424 or adjusting the thickness h1 (refer to FIG. 6) of the first external support member 422 or the thickness h2 (refer to FIG. 6) of the first internal support member 424.

Referring to FIGS. 4 to 10, the shell 4 may include the second support portion 43 configured to support the sealing portion 5 at a position spaced apart from the first support portion 42.

For example, the first support portion 42 may be disposed on an upper side and a lower side of the shell body 41 on the basis of the third axial direction (Z-axis direction), and the second support portion 43 may be disposed on a left side and a right side of the shell body 41 on the basis of the first axial direction (Y-axis direction).

The second support portion 43 may include the second rear support member 431, the second external support member 432, the second connecting member 433, and the second internal support member 434.

The second rear support member 431 is configured to support the sealing portion 5 in the rear of the sealing portion 5 to restrict a distance by which the sealing portion 5 is movable backward. The second external support member 432 is configured to protrude forward from the second rear support member 431 and support the inner surface of the sealing portion 5. The second connecting member 433 is coupled to the second external support member 432 to be located in front of the second support portion 43. The second internal support member 434 is coupled to each of the second connecting member 433 and the shell body 41 and disposed to be spaced apart from the second external support member 432. The second rear support member 431, the second external support member 432, the second connecting member 433, and the second internal support member 434 approximately coincide with the first rear support member 421, the first external support member 422, the first connecting member 423, and the first internal support member 424 which have been described above, and thus a detailed description will be omitted.

Here, a distance between an outer surface of the second external support member 432 and an inner surface of the second internal support member 434 may be greater than the distance between the outer surface of the first external support member 422 and the inner surface of the first internal support member 424. For example, when the distance between the outer surface of the second external support member 432 and the inner surface of the second internal support member 434 is referred to as T2 in FIG. 10 and the distance between the outer surface of the first external support member 422 and the inner surface of the first internal support member 424 is referred to as T2 in FIG. 7, T2>T1 may be satisfied.

In this case, a thickness of the second external support member 432 may be formed to be thicker than a thickness of the first external support member 422, and a thickness of the second internal support member 434 may be formed to be thicker than a thickness of the first internal support member 424. That is, h1 and h2 of FIG. 6 may be greater than w1 and w2 of FIG. 9, respectively.

Accordingly, the receptacle connector 1 according to the present disclosure may improve strength with respect to the second support portion 43 to which an insertion force relatively higher in comparison to the first support portion 42 is applied while the receptacle connector is coupled to the plug connector.

In another embodiment according to the present disclosure, a distance between an inner surface of the second external support member 432 and an outer surface of the second internal support member 434 may be formed to be greater than the distance between the inner surface of the first external support member 422 and the outer surface of the first internal support member 424. For example, when the distance between the inner surface of the second external support member 432 and the outer surface of the second internal support member 434 is referred to as g2 in FIG. 10 and the distance between the inner surface of the first external support member 422 and the outer surface of the first internal support member 424 is referred to as g1, g2>g1 may be satisfied. Accordingly, a distance by which the second external support member 432 is movable toward the second internal support member 434 may be implemented to be greater than a distance by which the first external support member 422 is movable toward the first internal support member 424. Accordingly, the receptacle connector 1 according to the present disclosure may reinforce a buffering force of the second support portion 43 to which an insertion force higher in comparison to the first support portion 42 is applied.

The first support portion 42 and the second support portion 43 may be integrally formed to have a hollow ring shape overall. The first rear support member 421, the first external support member 422, the first internal support member 424, the first connecting member 423, and the shell body 41 may be integrally formed. Likewise, the second rear support member 431, the second external support member 432, the second connecting member 433, the second internal support member 434, and the shell body 41 may be integrally formed. In this case, the first support portion 42, the second support portion 43, and the shell body 41 may be processed using a deep drawing method to be integrally formed without a joint.

Figure 7:
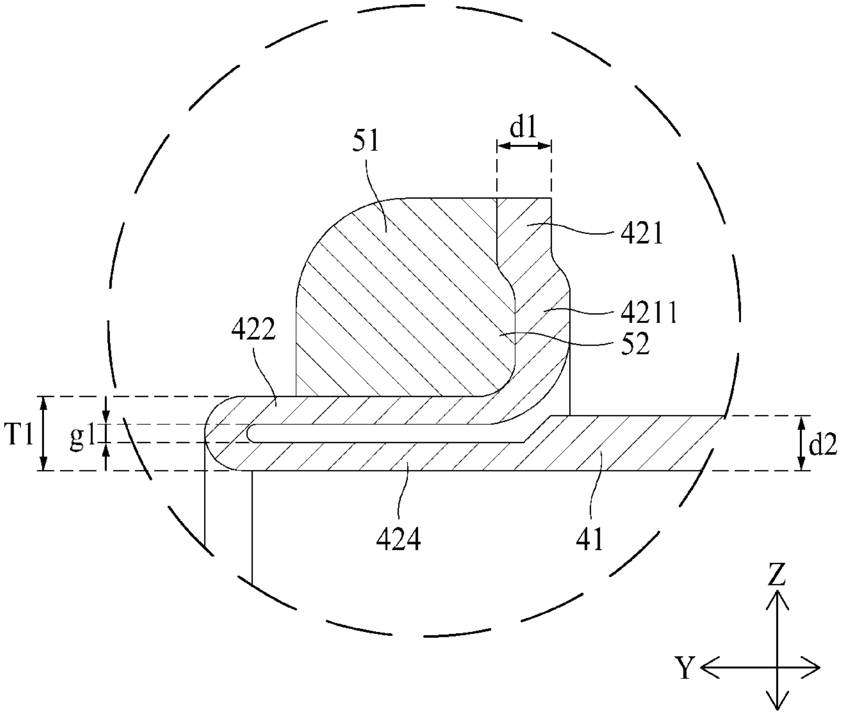
Figure 8:
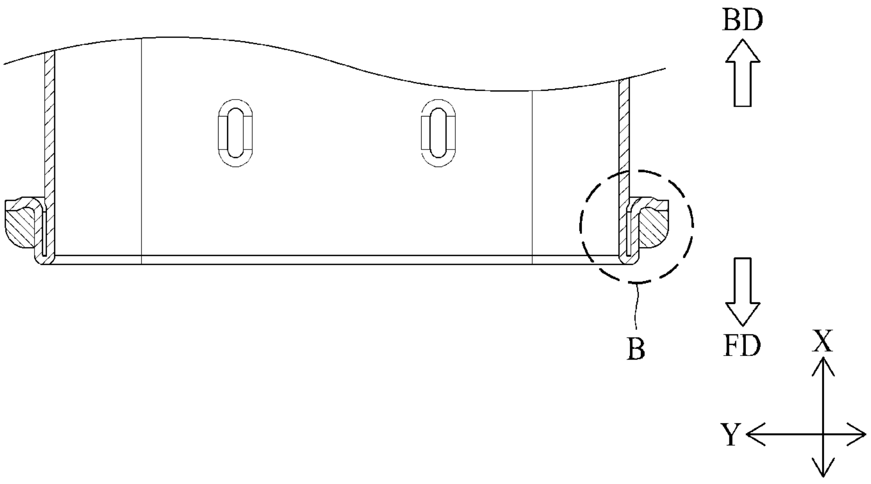
FIG. 8 is a schematic cross-sectional view illustrating a part of the receptacle connector according to the present disclosure taken along line II-II of FIG. 2.

Referring to FIGS. 6 and 7, the first rear support member 421 may include a first support protrusion 4211 (refer to FIG. 6) protruding rearward and a first support groove 4212 (refer to FIG. 6) disposed on a front surface of the first support protrusion 4211. The front surface of the first support protrusion 4211 may mean a surface disposed in front on the basis of the first axial direction (X-axis direction), and a rear surface of the first support protrusion 4211 may mean a surface disposed in the rear on the basis of the first axial direction. The front surface of the first support protrusion 4211 may be formed as a concavely curved surface, and the rear surface of the first support protrusion 4211 may be formed as a convexly curved surface. In this case, the sealing portion 5 may include a sealing body 51 (refer to FIG. 7) inserted between the first rear support member 421 and the first external support member 422 and a sealing protruding portion 52 (refer to FIG. 9) protruding from the sealing body 51 and inserted into the first support groove 4212. The sealing body 51 may be supported by the first rear support member 421 to be restricted in moving backward and may be supported by the first external support member 422 in a radial direction. The sealing protruding portion 52 may be restricted, by the first support protrusion 4211, in moving backward. Since a surface of the first support protrusion 4211 which supports the sealing protruding portion 52 is formed as a curved surface, in comparison to a comparative example in which the sealing portion 5 is supported by a flat surface, a length of the first rear support member 421 on the basis of the third axial direction (Z-axis direction) may be maintained and an area of supporting the sealing portion 5 may be increased. Accordingly, the receptacle connector 1 according to the present disclosure may distribute a supporting force of the first rear support member 421 with respect to the sealing portion 5 without increasing an overall length so as to prevent the plug connector from being broken and damaged by an excessive insertion force. The first support protrusion 4211 may be formed to have a thickness thicker than at least one of thicknesses of the first external support member 422 and the first internal support member 424. Accordingly, a supporting force of the first support protrusion 4211 to support the sealing protruding portion 52 may be further reinforced.

Figure 9:
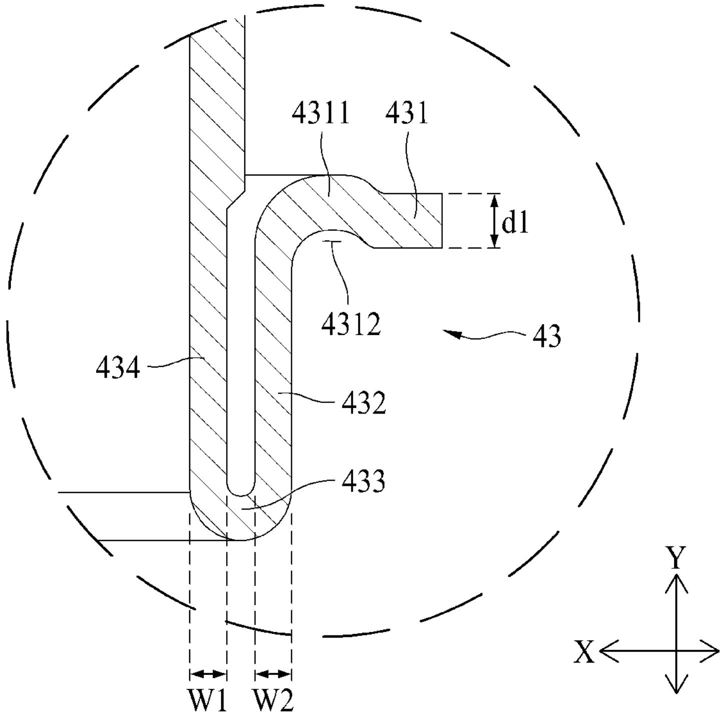
FIGS. 9 and 10 are enlarged schematic cross-sectional views illustrating part B of FIG. 8.
Figure 10:
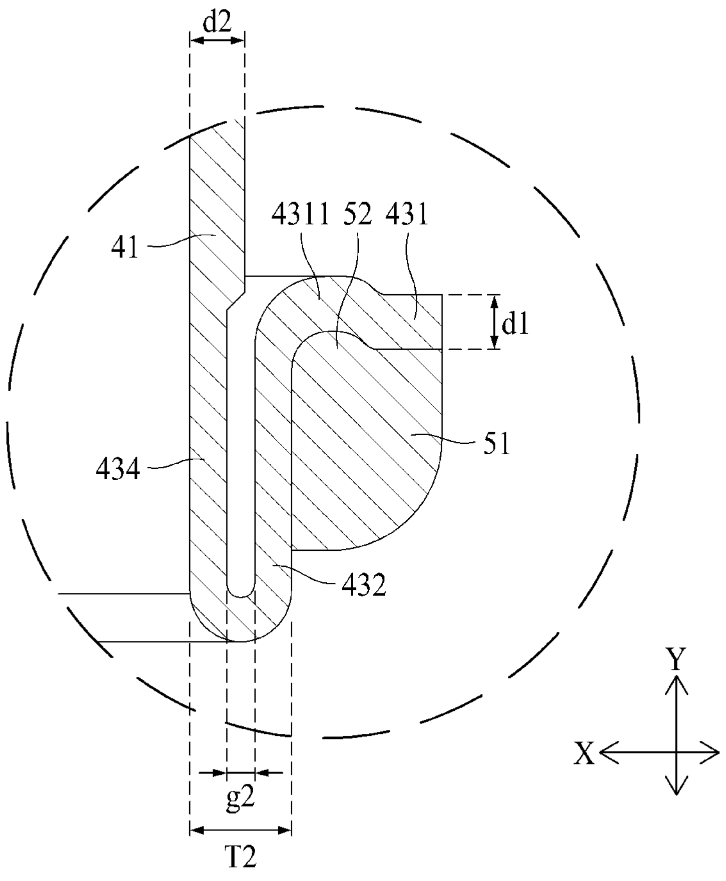

Referring to FIGS. 9 and 10, the second rear support member 431 may include a second support protrusion 4311 (refer to FIG. 9) protruding rearward and a second support groove 4312 (refer to FIG. 9) disposed on a front surface of the second support protrusion 4311. The front surface of the second support protrusion 4311 may mean a surface disposed in front on the basis of the first axial direction (X-axis direction), and a rear surface of the second support protrusion 4311 may mean a surface disposed in the rear on the basis of the first axial direction. Since the second support protrusion 4311 and the second support groove 4312 approximately coincide with the first support protrusion 4211 and the first support groove 4212 which are described, respectively, a detailed description will be omitted.

Also, in another embodiment of the present disclosure, the shell body 41 may be formed to have a thickness which is thicker in comparison to all of the first external support member 422, the first internal support member 424, the second external support member 432, and the second internal support member 434. That is, it may be satisfied that $d2>h1$, $d2>h2$, $d2>w1$, and $d2>w2$. Accordingly, in comparison to the first external support member 422, the first internal support member 424, the second external support member 432, and the second internal support member 434, the thickness of the shell body 41 may be further reinforced.

Referring to FIGS. 2 and 3, the cover 6 is configured to protect the shell 4. The cover 6 may be coupled to the shell 4. The cover 6 may be fixedly coupled to the substrate. The cover 6 may be mounted on the substrate using a surface mount technology so as to be fixedly coupled to the substrate.

The cover 6 may include a first cover body 61 and a second cover body 62.

The first cover body 61 is disposed on one side of the shell body 41. For example, the first cover body 61 may be coupled to the shell body 41 to cover an upper side of the shell body 41 and parts of both sides of the shell body 41.

The second cover body 62 is disposed on the other side of the shell body 41. For example, the second cover body 62 may be coupled to the shell body 41 to cover a lower side of the shell body 41 and parts of both sides of the shell body 41. As the second cover body 62 and the first cover body 61 are coupled to each other, the shell body 41 may be disposed inside the second cover body 62 and the first cover body 61.

Referring to FIG. 3, the receptacle connector 1 according to the present disclosure may include a mid plate 7.

The mid plate 7 is disposed between the first insulation member 31 and the second insulation member 32. The mid plate 7 may be located between the first insulation member 31 and the second insulation member 32 so as to reinforce the strength of the insulation portion 3. Also, the mid plate 7 may perform a shielding function with respect to the connection member 21 disposed on each of the first insulation member 31 and the second insulation member 32. The mid plate 7 may be formed to have a material having strength greater than that of the insulation portion 3. For example, the mid plate 7 may be formed of a metal, and the insulation portion 3 may be formed of a synthetic resin.

Referring to FIG. 3, the receptacle connector 1 according to the present disclosure may include a waterproof portion 8.

The waterproof portion 8 is configured to implement a waterproof structure with respect to an inside of the shell 4. The waterproof portion 8 may implement the waterproof structure with respect to the inside of the shell 4 by sealing a gap between an outer surface of the insulation portion 3 and an inner surface of the shell 4. The waterproof portion 8 may be formed to partially surround the contacts 2 so as to implement the waterproof structure with respect to the contacts 2. The waterproof portion 8 may be formed by applying and curing a potting solution to the inside of the shell 4 while the insulation portion 3 to which the contacts 2 are coupled is inserted in the shell 4.

While the exemplary embodiments of the present disclosure and their advantages have been described in detail with reference to the accompanying drawings, it will be apparent to those skilled in the art to which the present disclosure belongs that various changes, substitutions and alterations may be made herein without departing from the scope of the present disclosure.

The invention claimed is:

1. A receptacle connector comprising:

a plurality of contacts configured to electrically connect a plug connector to a substrate provided in an electronic device;

an insulation portion to which the contacts are coupled;

a shell to which the insulation portion is coupled; and a sealing portion configured to seal a space between the electronic device and the shell, wherein the shell comprises a shell body configured to accommodate the insulation portion and a first support portion configured to support the sealing portion, wherein the first support portion comprises:

a first rear support member configured to support the sealing portion in the rear of the sealing portion to restrict a distance by which the sealing portion is movable backward;

a first external support member protruding forward from the first rear support member and configured to support an inner surface of the sealing portion;

a first connecting member coupled in front of the first external support member; and a first internal support member coupled to each of the first connecting member and the shell body and disposed to be spaced apart from the first external support member, and wherein the shell body is formed to have a thickness thicker than at least one of thicknesses of the first external support member and the first internal support member.

2. The receptacle connector of claim 1, wherein the first rear support member is formed to have a thickness thicker than at least one of thicknesses of the first external support member and the first internal support member.

3. The receptacle connector of claim 1, wherein the first internal support member is formed to have a thickness thicker than that of the first external support member.

4. The receptacle connector of claim 1, wherein a distance between an outer surface of the first external support member and an inner surface of the first internal support member is smaller than two times a thickness of the shell body.

5. The receptacle connector of claim 1, wherein the shell comprises a second support portion configured to support the sealing portion at a position spaced apart from the first support portion, wherein the second support portion comprises:

a second rear support member configured to support the sealing portion in the rear of the sealing portion to restrict the distance by which the sealing portion is movable backward;

a second external support member protruding forward from the second rear support member and configured to support the inner surface of the sealing portion;

a second connecting member coupled to the second external support member to be located in front of the second support portion; and a second internal support member coupled to each of the second connecting member and the shell body and disposed to be spaced apart from the second external support member, and wherein a distance between an outer surface of the second external support member and an inner surface of the second internal support member is greater than the distance between an outer surface of the first external support member and an inner surface of the first internal support member.

6. The receptacle connector of claim 5, wherein a thickness of the second external support member is formed to be thicker than a thickness of the first external support member, and wherein a thickness of the second internal support member is formed to be thicker than a thickness of the first internal support member.

7. The receptacle connector of claim 5, wherein a distance between an inner surface of the second external support member and an outer surface of the second internal support member is greater than a distance between an inner surface of the first external support member and an outer surface of the first internal support member.

8. The receptacle connector of claim 1, wherein the first rear support member comprises a first support protrusion protruding rearward and a first support groove disposed on a front surface of the first support protrusion, and wherein the sealing portion comprises a sealing body inserted between the first rear support member and the first external support member and a sealing protruding portion protruding from the sealing body and inserted into the first support groove.

9. The receptacle connector of claim 5, wherein the shell body is formed to have a thickness thicker than those of all of the first external support member, the first internal support member, the second external support member, and the second internal support member.

10. The receptacle connector of claim 1, wherein the first connecting member is formed to have a curved surface disposed in front.

11. The receptacle connector of claim 1, wherein the first rear support member, the first external support member, the first internal support member, the first connecting member, and the shell body are integrally formed.

12. The receptacle connector of claim 8, wherein the first support protrusion is formed to have a thickness thicker than at least one of thicknesses of the first external support member and the first internal support member.

* * * * *